(12) United States Patent  
Bora et al.

(10) Patent No.: US 9,396,051 B2  
(45) Date of Patent: Jul. 19, 2016

(54) INTEGRATION APPLICATION BUILDING TOOL

(71) Applicant: ORACLE INTERNATIONAL CORPORATION, Redwood Shores, CA (US)

(72) Inventors: Prantor Bora, Apple Valley, MN (US); David Burch, Cleveland, MN (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/506,888

(22) Filed: Oct. 6, 2014

(65) Prior Publication Data

US 2016/0098307 A1    Apr. 7, 2016

(51) Int. Cl.

| G06F 9/44  | (2006.01) |
| G06F 9/46  | (2006.01) |
| G06F 3/00  | (2006.01) |
| G06F 13/00 | (2006.01) |
| G06F 9/54  | (2006.01) |
| G06F 17/30 | (2006.01) |

(52) U.S. Cl.
CPC .......... *G06F 9/546* (2013.01); *G06F 17/30908* (2013.01)

(58) Field of Classification Search
None
See application file for complete search history.

(56) References Cited

U.S. PATENT DOCUMENTS

| 6,256,676 B1* | 7/2001 | Taylor ................... G06Q 10/06 709/246 |
| 7,970,918 B2* | 6/2011 | Thompson .......... H04L 12/5695 709/230 |
| 2004/0143631 A1* | 7/2004 | Banerjee ............... G06F 9/4448 709/206 |
| 2005/0021836 A1* | 1/2005 | Reed ....................... G06F 9/542 709/238 |
| 2011/0258688 A1* | 10/2011 | Peterson ................. G06F 9/542 726/7 |

* cited by examiner

*Primary Examiner* — H S Sough  
*Assistant Examiner* — Kimberly Jordan  
(74) *Attorney, Agent, or Firm* — Kraguljac Law Group, LLC (57) ABSTRACT

Systems, methods, and other embodiments associated with an integration application building tool are described. In one embodiment, a method includes providing data files including an adapter data file, a flow data file, and an environment data file. The adapter data file stores adapter data corresponding to a plurality of adapters for respective enterprise applications. An adapter for a given enterprise application enables the given enterprise application to exchange messages with a messaging system. The flow data file describes to a plurality of flows of messages, through the messaging system, between enterprise applications. The environment data file is configured to be populated with location data. The method includes, receiving an instance of location data and populating the environment data file. An adapter application comprising computer code is generated that, when executed, allows the enterprise application to exchange messages with the messaging system. The adapter application is deployed on integration bus hardware.

18 Claims, 6 Drawing Sheets

INTEGRATION APPLICATION BUILDING TOOL

BACKGROUND

An enterprise system integrates disparate processing systems by providing a means for the various systems to communicate with one another. Many enterprise systems provide a standard messaging system which acts as a central communication hub. Integrating the processing systems with the standard messaging system often involves a developer writing custom computer code specific to the processing system and the messaging system being integrated.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Enterprise system applications interact with various integration applications that allow the enterprise system applications to send and receive messages on the enterprise system's messaging system. Systems and methods are described herein that provide integration application building tools that automatically build and deploy the integration applications. The integration application building tools receive limited, installation specific, information from a user of the enterprise system about computer hardware that executes each enterprise application. Other data necessary to build integration applications for a variety of enterprise applications is included with the integration application building tools. By providing all but installation specific data and automatically building and deploying integration applications, the integration application building tools provided by the invention greatly simplify the process of setting up an enterprise system. The integration application building tools described herein enable users with only limited expertise to set up an enterprise system.

The following description will often use the context of a retail based enterprise system. The systems and methods described herein can be used in any enterprise system that would benefit from automatically building and deploying integration applications for different types of enterprise applications.

Figure 1:
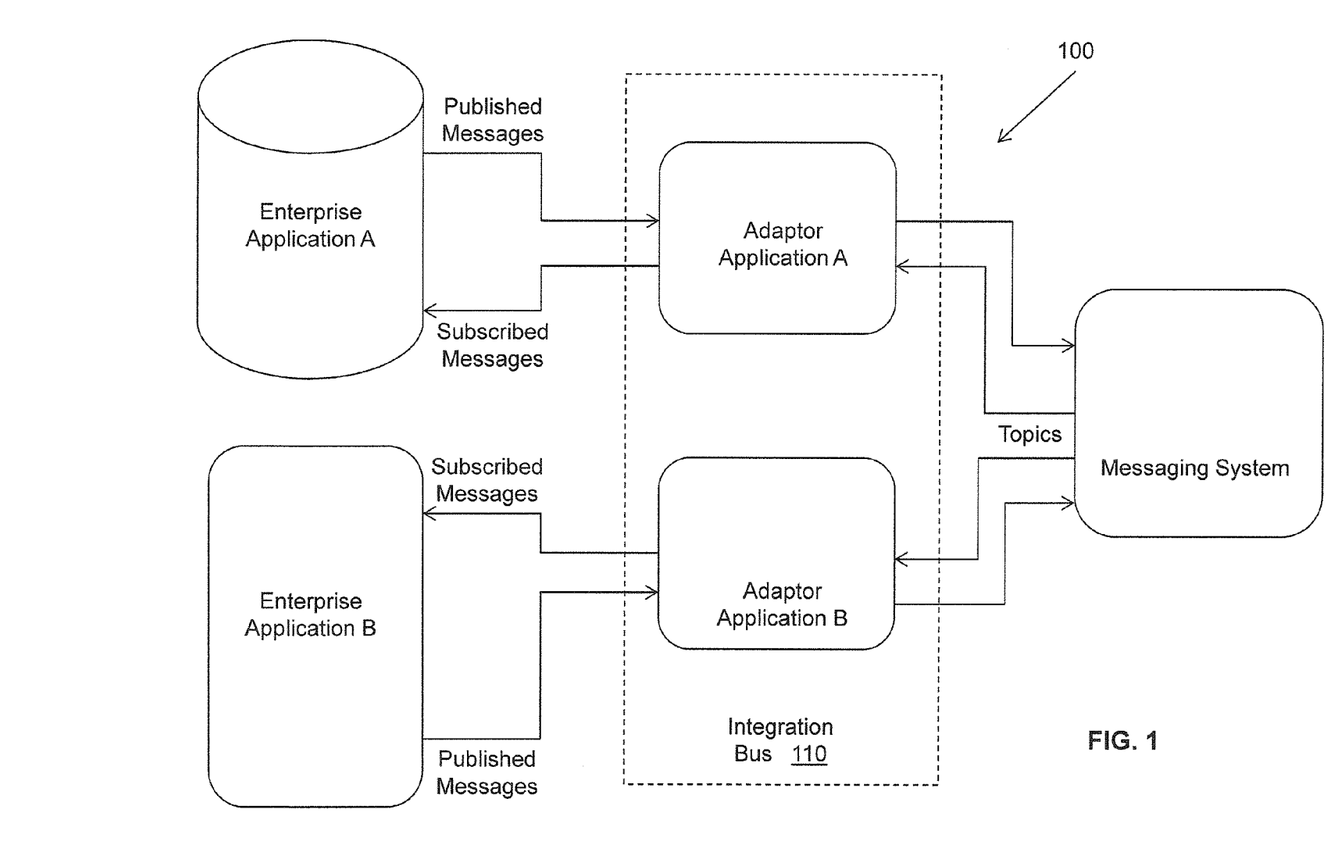
FIG. 1 illustrates one embodiment of an enterprise system that includes an integration bus.

FIG. 1 illustrates one embodiment of an enterprise system 100 that includes two enterprise applications A and B, an integration bus 110, and a messaging system. Enterprise application A is a Procedural Language/Structured Query Language (PL/SQL) application. Enterprise application B is a Java application. The messaging system is a Java Message System (JMS) system. The integration bus 110 is a distributed integration infrastructure that uses Message Oriented Middleware (MOM) to integrate enterprise applications.

The integration bus 110 allows various enterprise applications to integrate in asynchronous and near real time fashion. Each of the enterprise applications has its own implementation and deployment strategies and approaches, as well as individual integration touch points defined. The integration bus 110 acts as a shared communication layer for connecting various enterprise applications throughout an enterprise computing infrastructure.

The integration bus 110 is a collection of integration applications that enable communication between the various enterprise applications and the messaging system. One type of integration bus application is an adapter application (e.g., adapter application A and adapter application B), which enables communication between a particular enterprise application and the messaging system. The integration bus 110 includes an adapter application for each enterprise application.

In one embodiment, the integration bus 110 is an asynchronous publication and subscription messaging integration architecture. An enterprise application publishing a message need not know about the enterprise applications that subscribe to the message, other than the requirement that at least one subscriber must exist. The integration bus 110 decouples the enterprise applications operationally. Once a subscribing enterprise application (hereinafter "subscriber EA") is registered, the integration bus 110 persists all published messages until all subscribers have seen them. The enterprise application publishing a message (hereinafter "publisher EA") does not know, or care, how many EA subscribers are waiting for the message, what types of integration applications the EA subscribers are using, what the EA subscribers' current states are (running or stopped), or where the EA subscribers are located. Delivering the message to all EA subscribers is the responsibility of the integration bus 110.

Physically, messages must reside somewhere so that each message is available until all EA subscribers have processed it. The integration bus 110 uses the messaging system for its messaging infrastructure. The messaging system accepts the message from the adapter application and saves it to stable storage, as a message topic, until it is ready to be picked up by an EA subscriber. Message information is stored by the messaging system until all EA subscribers have read and processed it.

Integration bus interfaces are organized by message family. Each message family contains information specific to a related set of operations on a business entity or related business entities. The EA publisher is responsible for publishing messages in response to actions performed on these business entities in the same sequence as they occur. Each message family has specific message payloads based on agreed upon business elements between the enterprise applications. The message payloads (e.g., XML payload data) describe business objects in a standard way and are governed by the integration bus 110 on behalf of the enterprise applications.

The design and architecture of the integration bus 110 is based on two policies driven by the needs of many enterprise application business models: i) guaranteed once-and-only-once successful delivery and ii) preservation of publication sequence. Messages are persisted until all EA subscribers have looked at the message and have successfully consumed it or decided they do not care about that message. In other words, the integration bus 110 delivers to every EA subscriber all messages except those filtered as per the enterprise application's requirements. A message is redelivered to the EA subscriber if the message was not consumed successfully.

The redelivery process is bound by the same rules of sequencing as normal (non-redelivered) messages. The messages are delivered to all the EA subscribers in the order (FIFO) the messages were published by the EA publisher. To enable this, the EA publisher defines a business object ID whose existence informs the integration bus 110 that this and all subsequent messages with the same business object ID have to be processed in order. Message ordering (FIFO) is maintained only for messages with the same business object ID within the same message family. Messages with the same business object ID are posted to the same "topic" in the messaging system. A topic is a well known destination for all messages in a predefined family of messages.

The integration bus 110 and integration envelope payload are designed around the concept of a message family. Each integration bus message belongs to a specific message family. Each message family contains information specific to a related set of operations on a business entity or related business entities. The EA publisher is responsible for publishing messages in response to actions performed on these entities in the same sequence as they occur.

One example of a message family is an Order message family used to contain information about purchase order events. A message family may contain multiple message types. Each message type encapsulates the information specific to a business entity within one or more business events. For example, the Order message family is published for events such as Create PO Header, Create PO Detail, Update PO Header, or Delete PO Detail.

A single business event, such as updating a purchase order, may involve multiple business entities, such as a line item within the purchase order. Because a single business event may involve multiple business entities, the enterprise application may publish messages for this event from multiple message families for a single business transaction. More than one message type within a message family may also be created.

In general, there are two types of messages, messages that communicate foundation data and messages that communicate transactional data. Foundation messages are defined as those with payload that carry basic product data. In a retail supply chain environment, a retail merchandising system application may publish foundation messages with data describing items that are sold, item locations, store locations, vendors, and warehouses. A warehouse management system application and an inventory management system application are subscribers to messages that contain foundation data relevant to that particular system's operation.

After foundation data messages have been subscribed to, the enterprise applications are prepared to publish and subscribe to transaction data messages. Transactional messages communicate business events involving two or more organizations within an enterprise. Continuing with the retail supply chain example, the retail merchandising system application may publish messages containing data about item allocations and item transfers. The warehouse and inventory system applications subscribe to these types of messages. The warehouse management system application may publish messages about inbound and outbound shipments which are subscribed to by the inventory management system application.

When an adapter application for a publishing enterprise application publishes a message, it wraps the message in an envelope known as the integration bus (IB) envelope. The IB envelope is a standard message delivery format where the message information, the data payload, is contained within the overall delivery information. The envelope itself provides information that the integration bus 110 uses, such as routing information.

The publisher EA is responsible for creating the initial message contents. The integration bus 110 wraps the message in the envelope and publishes the message to the messaging system and makes it available to any EA subscribers. The integration bus 110 knows what EA subscribers are to receive the message due to an integration bus configuration that associates a set of subscribers to each publisher and message family combination.

Publish/subscribe is a one-to-many type of message distribution model where one source application en-queues the message and many destination applications can de-queue the same message and process the message independently of the other peer applications. In publish/subscribe the destinations are known as topics, the en-queuer application is known as publisher, and the de-queuer is known as subscriber. Unlike point-to-point, in publish/subscribe the publisher and subscriber are totally ignorant of each other and do not and should not know about each others existence.

The JMS Topics retain the messages only as long as it takes to distribute them to current active (running) subscribers. There is also a timing dependency between publishers and subscribers. A client that subscribes to a topic can consume only messages published after the client has created a subscription, and the subscriber must continue to be active in order for it to consume messages. The JMS specification relaxes this timing dependency to some extent by allowing clients to create durable subscriptions. By creating durable subscriptions the JMS server will continue to hold the messages for all registered subscribers for that topic until the subscriber consumes the message or deletes the subscription.

The integration bus defines logical grouping of retail specific business objects (BO) and business functions in a concept called message family. For every message family there is a corresponding JMS topic. These JMS topics are used as communication pipelines between the source and destination Oracle Retail applications for exchanging the business objects.

Message properties are attached to published messages and message subscribers use selectors. Message properties are used to convey information about the message outside of the actual message data to establish a logical channel for messages. JMS message selectors are used by the integration bus to filter the messages that each subscriber picks up. In other words, using the message properties, selectors act as a filter to weed out messages a subscriber should not process. The message property set and used by the RIB messages is called threadValue. The thread value is associated with a logical channel of a message stream. All messages for a specific family with a specific business object ID always contain the same threadValue property. This, combined with the standard first in, first out (FIFO) message ordering on the topic, is integral to message sequencing. Messages with different threadValue properties are not guaranteed to be processed in the same relative order as publishing.

Messages published without JMS Message Property present will not be picked up by the standard subscribing RIB adapters. Every message published by the integration adapter applications includes a number of JMS user defined header properties.

Figure 2:
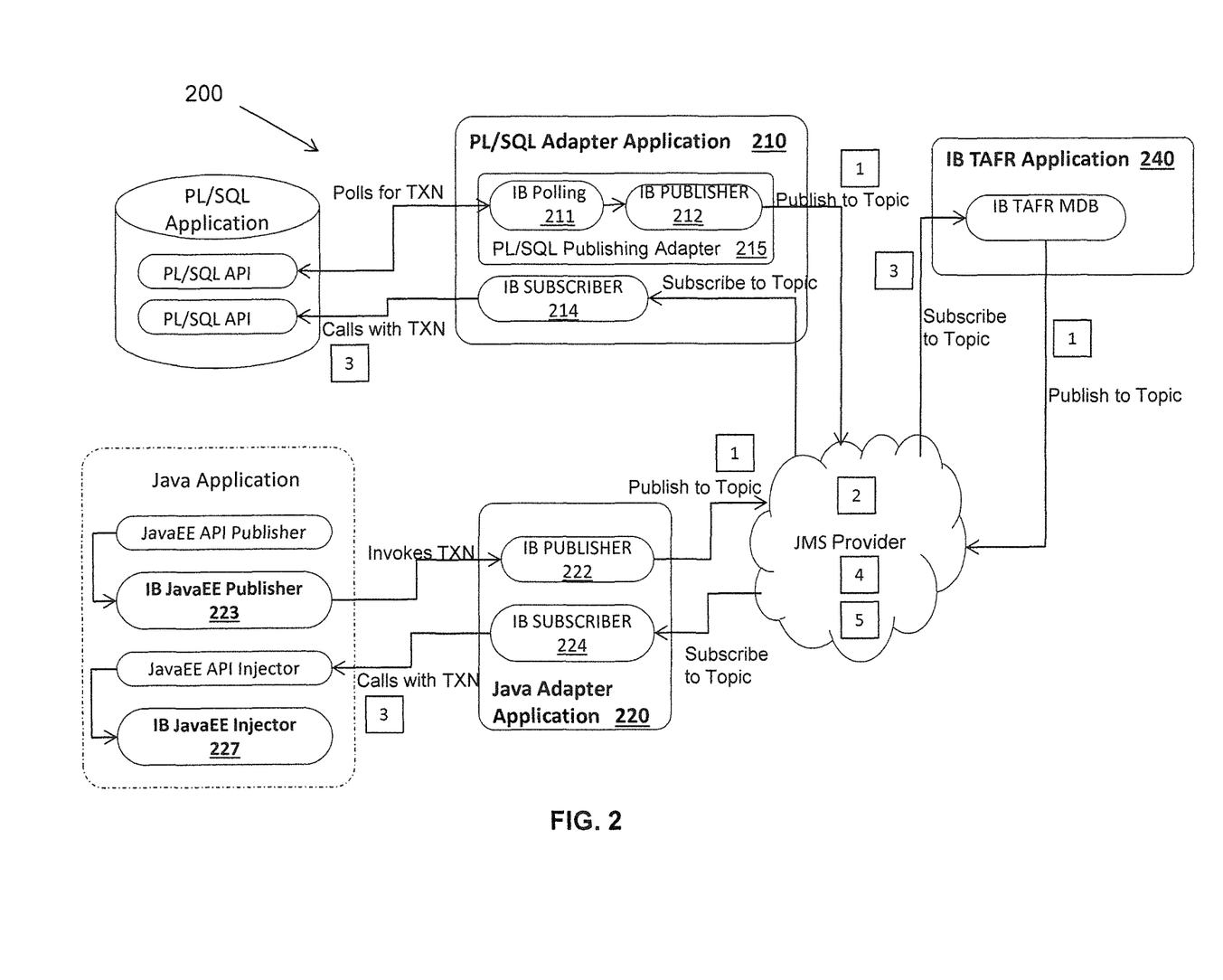
FIG. 2 illustrates one embodiment of an enterprise system that includes an integration bus.

FIG. 2 illustrates one embodiment of an enterprise system 200. The enterprise system includes a PL/SQL application, a Java application, and a JMS provider. In a retail enterprise system, retail merchandising system and retail warehouse management system are often PL/SQL based applications while an inventory management system is often a Java application. The enterprise system also includes an integration bus, which is a collection of integration applications (labeled in bold), namely a PL/SQL adapter application 210, a Java adapter application 220, and a Transform Address Filters/Router (TAFR) application 240.

The integration bus will also typically include an error hospital (not shown) that processes and stores messages having an error. Before publishing or subscribing to a message topic, the adapter applications check the error hospital to see if any messages in that topic are stored in the error hospital and if so, the new message is saved in the error hospital rather than being delivered to its destination to preserve the order of messages. A detailed description of the error hospital is omitted herein for simplicity sake. The integration bus may also include additional applications, which are not described herein for simplicity sake.

The PL/SQL adapter application 210 includes an IB polling module 211 and an IB publisher module 212, which together make a PL/SQL publishing adapter 215. PL/SQL database tables associated with the PL/SQL application's publishing API stage outgoing message information. The polling module 211 polls the PL/SQL application via a stored procedure call to determine if any transactions have occurred that involve messages to be published. The IB publisher module 212 accepts payload information from the polling module to be published. The IB publisher module 212 wraps the payload information in the envelope and publishes the messages to the JMS provider.

An IB subscriber module 214 handles subscribing to and receiving messages for select topics. The IB subscriber module 214 calls the PL/SQL subscribing API with a transaction when a message is available for consumption. The IB subscriber module 214 ensures that the message is properly consumed by the PL/SQL application and retries and/or submits a message to the error hospital (not shown) when the message cannot be consumed by the PL/SQL application.

The Java adapter application 220 includes an IB publisher module 222 and an IB subscriber module 224. For Java enterprise applications, the integration bus also includes a Java publisher module 223 and a Java injector module 227 that are installed in the Java enterprise application. The Java publisher module 223 calls the IB publisher module 222 by invoking a transaction and providing the message payload. In one embodiment, the IB publisher module 222 comprises an Enterprise Java Bean (EJB) that accepts payload information to be published. The IB subscriber module 224 ensures that the message is properly consumed by the Java injector module 227 and retries and/or submits a message to the error hospital when the message cannot be consumed by the Java injector module 227.

The TAFR application 240 is an optional integration application that is used to transform a message payload into a different format (e.g., a different business object) and re-publish the message under a new topic that is subscribed to by enterprise applications that require the different format. The TAFR opens each message, modifies its contents as appropriate, and then publishes the modified message to a new topic. The source topic and destination topic are distinct/different topics. There may be new subscribers to the modified message, and the scenario is repeated for each of these subscribers.

In one embodiment, the integration applications are developed using Enterprise Java Beans (EJB) components architecture, subscriber modules use Message Driven Beans (MDBs) and publisher modules use Stateless Session Beans (SLSBs). Subscriber and TAFR adapters use the MDB technology to register with JMS topics and receive messages for further processing. A published message resides on the messaging system (e.g., JMS Provider) immediately after publication. The topic in the messaging system provides stable storage for the message in case a system crash occurs before all message subscribers receive and process it.

The typical lifecycle of a message through the integration bus is shown in FIG. 2 with labels as follows:

1. The IB publisher module creates the message. The event that triggers the message creation may be a polling operation in case of PL/SQL applications or a synchronous invoke in case of Java applications. The message is published to a predetermined JMS topic.

2. The message is now available for all registered subscribers to the JMS topic for pick up. Subscription is based on the message family.

3. IB subscriber modules receive messages to which their enterprise application subscribes. Once a subscriber gets the message, it is free to process that message according to its own rules. In the case of a transformer adapter, the adapter can open the message, modify its contents, and then publish the modified message to a new topic. The source topic and destination topic that a TAFR uses must always be distinct/different topics. There may be new subscribers to the modified message, and the scenario is repeated for each of these subscribers.

4. When each subscriber has finished (commit) processing a message, the JMS server updates the state of the message to reflect that it has been processed by this subscriber.

5. The JMS Server deletes the messages on the topic after delivering it to all the registered subscribers.

Integration Application Building Tool

Figure 3:
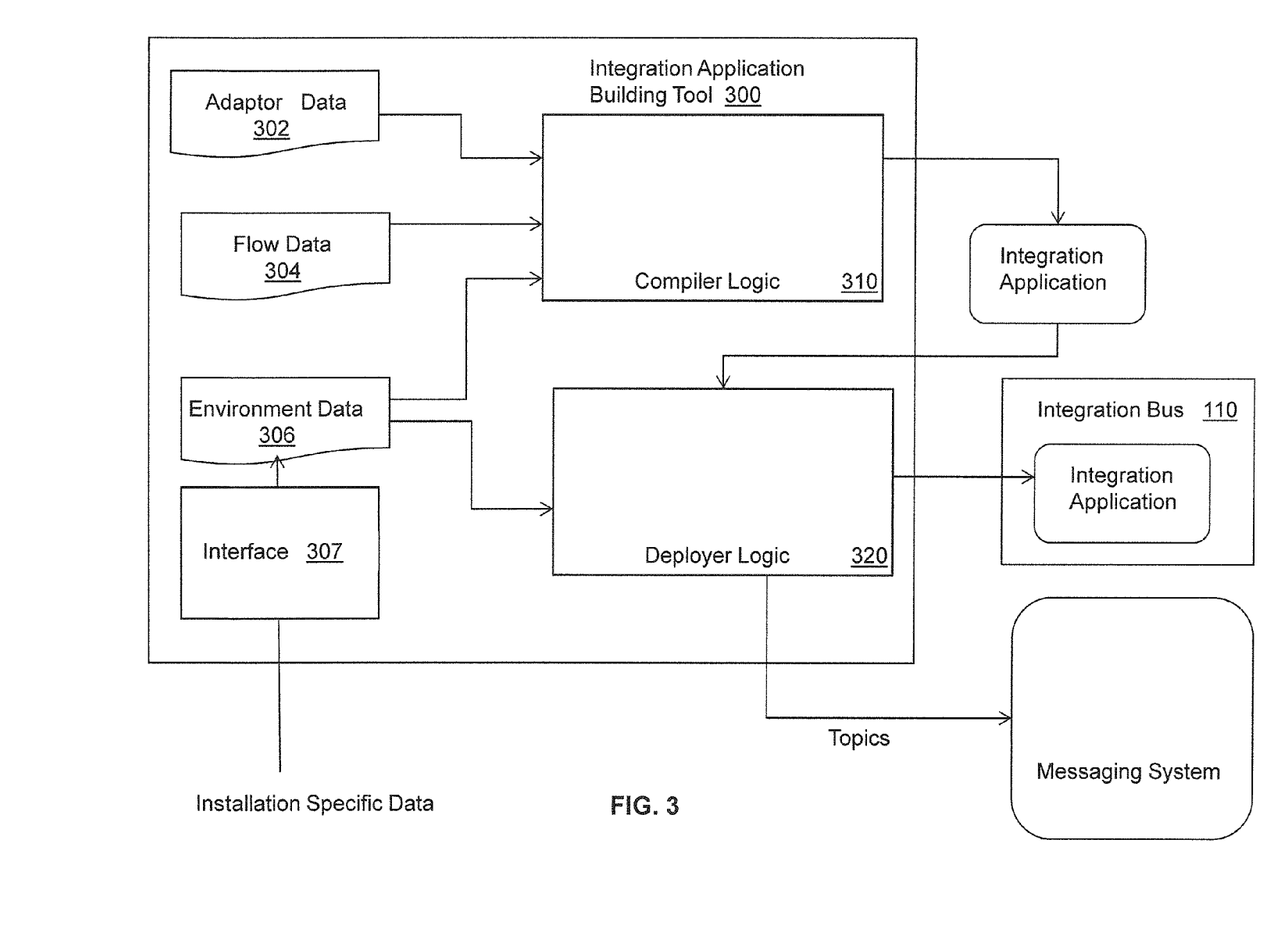
FIG. 3 illustrates one embodiment of an application building tool.

FIG. 3 illustrates one embodiment of an application building tool 300 that builds and deploys integration applications to create an integration bus for an enterprise system. In one embodiment, the application building tool 300 is delivered to a customer as a collection of data files and an executable kernel that, when installed in the customer's computing system, causes the computing system to perform the functions of a compiler logic 310 and a deployer logic 320. In this embodiment, components of the customer's computing system are themselves the compiler logic 310 and the deployer logic 320.

The application building tool 300 includes three configuration data files: an adapter data file 302, a flow data file 304, and an environment data file 306. The adapter data file 302 includes information needed by various enterprise applications to interface with a messaging system. For example, the adapter data file includes API XML files that define the API for each type of enterprise application (e.g., PL/SQL enterprise applications and Java enterprise applications). The API XML files specify where the enterprise application stores outgoing messages and receives incoming messages, how the enterprise application notifies that a message has been properly consumed, and so on. This information is used to build the integration applications necessary for the particular type of enterprise application.

The flow data file 304 defines a superset of possible flows between various enterprise applications. For example, in a retail enterprise system, the inventory enterprise application publishes a message to report a receipt of merchandise. This message should be provided to (or subscribed to by) the retail merchandising application and the warehousing system. Thus, a flow is defined in the flow data file 304 for messages with the topic "receipt" between the inventory enterprise application and the retail merchandising enterprise application and the warehouse enterprise application. The flow data may also include flows through a TAFR application when some enterprise applications require a different format for some business objects. The information in the flow data file is used build integration bus applications for the various enterprise applications that publish messages and subscribe to messages so that all applicable message flows in the flow data are accomplished by the integration bus.

The environment data file 306 includes a data structure that is configured to be populated by the customer with hardware related data specific to the customer's enterprise system. The environment data file 306 is configured to store data about the location (e.g., the URL of a particular server) of various enterprise applications (e.g., the retail merchandising enterprise application and the inventory enterprise application) and the messaging system. The environment data file 306 captures data about the hardware running the enterprise applications, such as the number and types of ports a server has, and so on. The environment data file also captures information about which hardware components in the customer's enterprise system will host the interface bus (e.g., the collection of integration applications). The application building tool 300 may also include an interface 307 configured to prompt a customer to input the data needed to populate the environment data file 306. In one embodiment, the environment data file is the only file the customer edits during the integration bus building and deployment, greatly simplifying the process for the customer.

As will be described in more detail with respect to FIG. 4, the compiler logic 310 is configured to input data from the adapter data file 302, the flow data file 304, and environment data file 306 and to build integration applications such as adapter applications, a TAFR application, and any other integration applications needed for the integration bus for the particular enterprise system. The deployer logic 320 is configured to deploy the integration application in the location prescribed by the customer in the environment data file 306.

Figure 4:
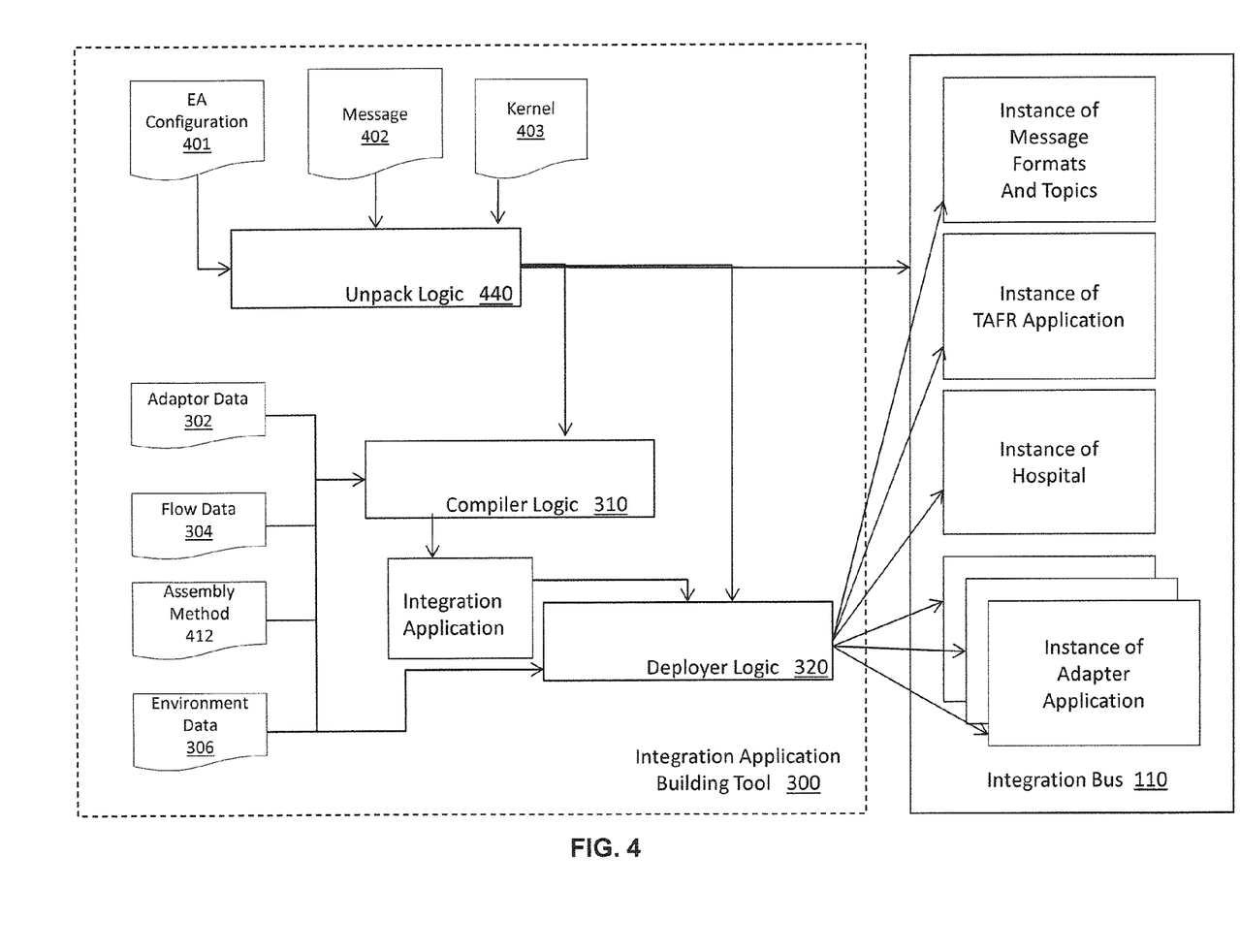
FIG. 4 illustrates one embodiment of an application building tool.

FIG. 4 illustrates an overview of one embodiment of the integration application building tool 300 building the integration bus 110. The integration application building tool 300 includes an unpack logic 440, the compiler logic 310, and the deployer logic 320. The application building tool 300 also includes several data files: an EA configuration file 401, a message file 403, a kernel file 403, the adapter data 302, the flow data 304, and the unpopulated environment data 306.

The EA configuration file 401 contains predefined configurations for all possible enterprise applications that might be used by the customer (e.g., a retail merchandising enterprise application, an inventory enterprise application, and so on). The message file 402 contains predefined message topics and message formats that have been established for the enterprise system. The message topics and formats will govern the format and routing of messages published by the enterprise applications. The kernel file 403 includes executable code that will create a home directory that is the structure of the integration bus 110. With the kernel, the unpack logic 440 creates the IB directory structure and installs the adapter data file 302, the flow data file 304, the environment data file 306, and an assembly method file 412 in the appropriate location in the directory structure.

The compiler logic 310, which comprises executable code that is running on the customer's computer system, inputs the adapter data 302, the flow data 304, and the populated environment data 306. Using the assembly method file 412, the compiler logic 310 constructs integration applications. The assembly method file 412 provides instructions for how to build integration applications for all possible integration applications (e.g., adapter applications, TAFR application, and so on, based on information in the adapter data 302, the flow data 304, and the populated environment data 306.

For example, the environment data might specify the following: the enterprise system includes a PL/SQL retail merchandising enterprise application installed on server A and a Java inventory system on server B; a JMS system on server C, and that the integration bus is to be installed on server C. The compiler logic 310 first verifies that the specified systems are present at the locations specified in the environment data file by probing them. In this manner, the compiler logic 310 validates the syntax of the adapter applications that will result from the environment data provided by the customer. The compiler logic 310 will create a hospital to be installed on server C as well as a TAFR application if one is used by the customer.

The compiler logic 310 will compile a PL/SQL adapter application for the retail merchandising enterprise application. The PL/SQL adapter application will communicate with the retail merchandising enterprise application using information about the APIs of the retail merchandising enterprise application found in the adapter data file 302. The PL/SQL adapter application will publish messages and subscribe to messages using the JMS on server C based on information found in the flow data file 304. The PL/SQL adapter application will access the hospital to determine if a message topic includes messages that have not been properly consumed.

The compiler logic 310 will compile a Java adapter application for the inventory system in an analogous manner to the PL/SQL adapter application. The Java adapter application will communicate with the inventory enterprise application on server B. The compiler logic 310 uses the environment data 306 to determine which particular enterprise system components are present in the customer's enterprise system and selects components of the EA configuration data 401 that are relevant to the components of the customer's enterprise system.

The deployer logic 320 stores selected message formats and topics as part of the integration bus 110. The message format information is used, when necessary, to convert an XML payload in a message to a data object (e.g., Java Bean) or a SQL object. The deployer logic 320 uses the message file 402 to build topics in the JMS on server C. For example, the deployer logic may build "item" topics, "PO" topics, and "receipts" topics in the JMS (not shown).

The deployer logic 320 invokes native commands on the server that hosts the integration bus to install the integration applications on the server. The deployer logic 320 deploys the applications created by the compiler logic 310 on the hardware specified in the environment data file (e.g., server C in the example). These instances of the integration applications form the integration bus 110. Once installed, the adapter applications subscribe to the appropriate message topics, send the appropriate foundation messages, and are then ready to handle transactional messages.

In one embodiment, the integration bus architecture is based on standard Java EE components and the Java Message Service (JMS). The integration solution provided by the integration bus is made up of multiple Java EE integration bus applications (IB applications) that are autonomous in their execution behavior and deployed in a distributed topology. Even though the IB applications are distributed and autonomous, they communicate and coordinate messages with each other—and work to provide a final asynchronous integration solution.

In one embodiment, the integration bus is designed and built on industry standard non-proprietary Java EE concepts and standards. Java Platform Enterprise Edition (Java EE) is an umbrella standard for Java's enterprise computing facilities. It bundles together technologies for an enterprise-class server-side development and deployment platform in java. Java EE specification includes several other API specifications, such as JDBC, RMI, Transaction, JMS, Web Services, XML, Persistence, mail, and others and defines how to coordinate among them. Java EE specification also features some specifications unique to enterprise computing. These include Enterprise JavaBeans (EJB), servlets, portlets, Java Server Pages (JSP), Java Server Faces (JSF) and several Web service technologies.

A Java EE application server manages transactions, security, scalability, concurrency, pooling, and management of the EJB/Web components that are deployed to it. This frees the developers to concentrate more on the business logic/problem of the components rather than spending time building scalable, robust infrastructure on which to run on. An Oracle Application Server implements the Java EE specification.

In one embodiment, the messaging system is the Java Message Service (JMS), also referred to as Messaging Oriented Middleware (MOM). By combining Java technology with enterprise messaging, the JMS API provides for the asynchronous exchange of business data and events throughout an enterprise. The JMS API adds to this a common API and provider framework that enables the development of portable, message based applications in the Java programming language.

The JMS API defines a common set of messaging concepts and programming strategies that will be supported by all JMS technology-compliant messaging systems. The JMS API is part of the Java Enterprise Edition platform, and application developers can use messaging with components using Java EE APIs (Java EE components). A JMS Provider is a vendor supplied implementation of the JMS interface, such as Oracle AQ JMS. Oracle Streams AQ implements the JMS specification and is the certified JMS provider for RIB in this release. AQ is built on top of the Oracle Database 11g Enterprise Edition.

Figure 5:
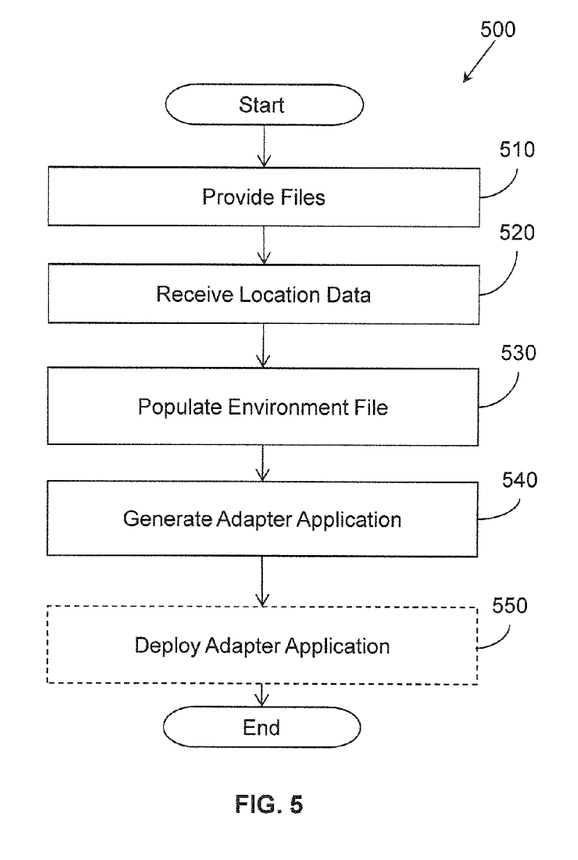
FIG. 5 illustrates one embodiment of a method that builds an integration application.

FIG. 5 illustrates one embodiment of a method 500 that automatically builds integration applications for an integration bus. At 510, the method includes providing data files including an adapter data file, a flow data file, and an environment data file. The adapter data file stores adapter data corresponding to a plurality of adapters for respective enterprise applications, where an adapter for a given enterprise application comprises computer code that enables the given enterprise application to exchange messages with a messaging system. The flow data file stores flow data corresponding to a plurality of flows of messages, through the messaging system, between enterprise applications. The environment data file is configured to be populated with location data comprising identification of computer hardware executing the respective enterprise applications.

The method includes, receiving an instance of location data (e.g., from a customer initializing an enterprise system) at 520 and, at 530, populating the environment data file with the instance of location data. The method includes, for at least one of the enterprise applications, generating an adapter application comprising computer code that, when executed, allows the enterprise application to exchange messages with the messaging system at 540. The adapter application is generated based, at least in part, on the adapter data, the flow data, and the location data. In one embodiment, the method 500 also includes, at 550, deploying the adapter application on integration bus hardware.

In one embodiment, the method also includes providing message data file that stores data corresponding to message topics for messages generated by the respective enterprise applications; and communicating the message data to the messaging system.

In one embodiment, the method includes providing a user interface configured to prompt a user to enter the location data. In one embodiment, the adapter data file, the flow data file, and the environment data file are XML files.

In one embodiment, the adapter application comprises a publisher module configured to capture messages from the enterprise application and publish the captured messages to the messaging system.

In one embodiment, the adapter application comprises a subscriber module configured to receive, from the messaging system, messages to which the enterprise application subscribes and communicate the received messages to the enterprise application. In one embodiment, a computing device is implemented with an executable algorithm that is configured to perform the method 500.

As can be seen from the foregoing description, by providing all but installation specific data and automatically building and deploying integration applications, the integration application building tool greatly simplifies the process of setting up an enterprise system. The integration application building tools described herein enable users with only limited expertise to set up an enterprise system.

Computer Embodiment

Figure 6:
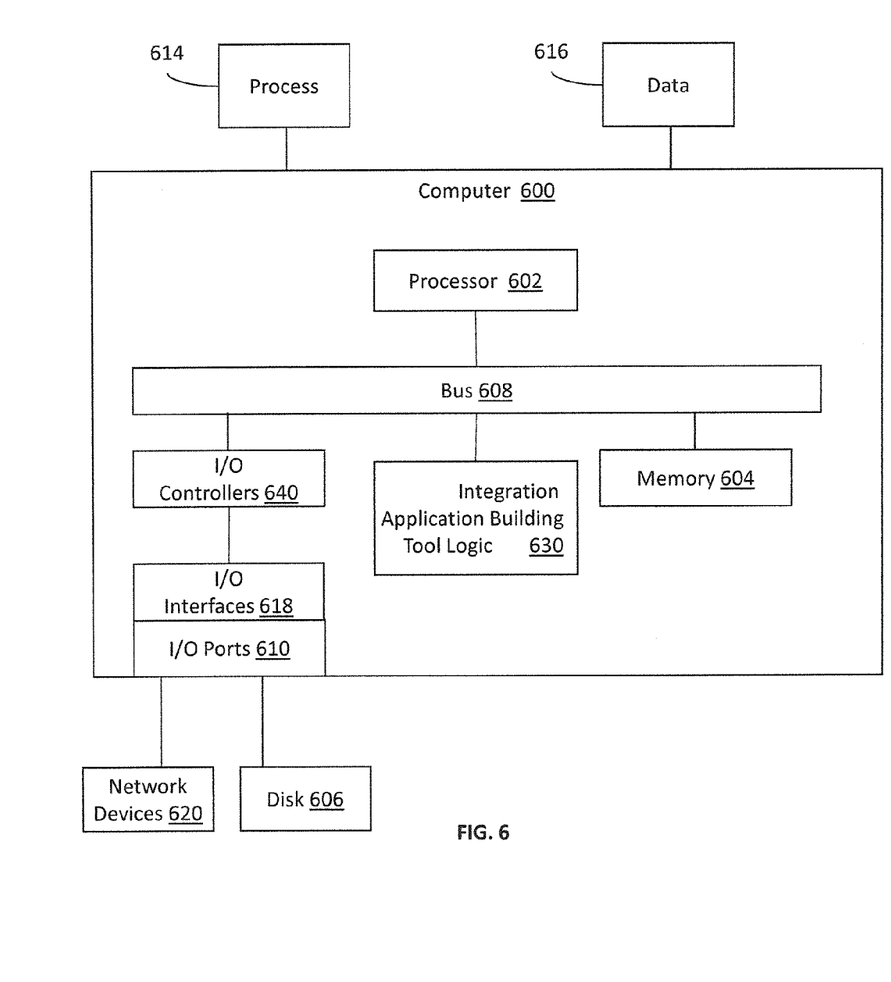
FIG. 6 illustrates an embodiment of a computing system configured with the example systems and/or methods disclosed.

FIG. 6 illustrates an example computing device that is configured and/or programmed with one or more of the example systems and methods described herein, and/or equivalents. The example computing device may be a computer 600 that includes a processor 602, a memory 604, and input/output ports 610 operably connected by a bus 608. In one example, the computer 600 may include integration application building tool logic 630 configured to facilitate automatically building and deploying integration applications to create an integration bus in an enterprise system. The integration application building tool logic 630 is similar to the integration application building tool 300 described with respect to FIGS. 1-4 and in some embodiments performs the method 500 of FIG. 5. In different examples, the integration application building tool logic 630 may be implemented in hardware, a non-transitory computer-readable medium with stored instructions, firmware, and/or combinations thereof. While the integration application building tool logic 630 is illustrated as a hardware component attached to the bus 608, it is to be appreciated that in one example, the integration application building tool logic 630 could be implemented in the processor 602.

In one embodiment, integration application building tool logic 630 or the computer is a means (e.g., hardware, non-transitory computer-readable medium, firmware) for performing the functions for automatically compiling and deploying an integration application described with respect to FIGS. 1-5.

The means may be implemented, for example, as an application specific integrated circuit (ASIC) programmed to perform the functions described with respect to FIGS. 1-5. The means may also be implemented as stored computer executable instructions that are presented to computer 600 as data 616 that are temporarily stored in memory 604 and then executed by processor 602.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, read-only memory (ROM), programmable ROM (PROM), and so on. Volatile memory may include, for example, random access memory (RAM), static RAM (SRAM), dynamic RAM (DRAM), and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a compact disc-ROM (CD-ROM) drive, a CD recordable (CD-R) drive, a CD rewritable (CD-RW) drive, a digital video disk (DVD) ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and universal serial bus (USB) ports.

The computer 600 can operate in a network environment and thus may be connected to the network devices 620 via the input/output (I/O) interfaces 618, and/or the I/O ports 610. Through the network devices 620, the computer 600 may interact with a network. Through the network, the computer 600 may be logically connected to remote computers. Networks with which the computer 600 may interact include, but are not limited to, a local area network (LAN), a wide area network (WAN), and other networks.

In another embodiment, the described methods and/or their equivalents may be implemented with computer executable instructions. Thus, in one embodiment, a non-transitory computer storage medium is configured with stored computer executable instructions that when executed by a machine (e.g., processor, computer, and so on) cause the machine (e.g., processor, computer, and so on (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C. §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable storage medium", as used herein, is a non-transitory medium that stores instructions and/or data configured to perform one or more of the disclosed functions. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other media with which a computer, a processor, or other electronic device can function. Each type of media, if selected for implementation in one embodiment, includes stored instructions of an algorithm configured to perform one or more of the disclosed functions. Computer-readable storage media described herein are limited to statutory subject matter under 35 U.S.C. §101.

"Logic", as used herein, includes a computer or electrical hardware, firmware, a non-transitory computer storage medium with stored instructions, and/or combinations of these configured to perform any of the functions or actions as disclosed herein, and/or to cause a function or action from another logic, method, and/or system to be performed as disclosed herein. Logic may include a microprocessor programmed with an algorithm, a discrete logic (e.g., ASIC); at least one circuit, an analog circuit, a digital circuit, a programmed logic device, a memory device containing instructions of an algorithm, and so on, all of which are configured to perform one or more of the disclosed functions. Logic may include one or more gates, combinations of gates, or other circuit components configured to perform one or more of the disclosed functions. Where multiple logics are described, it may be possible to incorporate the multiple logics into one logic. Similarly, where a single logic unit is described, it may be possible to distribute that single logic unit between multiple logics. In one embodiment, one or more of these logics and corresponding structure associated with performing the disclosed and/or claimed functions. Choice of which type of logic to implement may be based on desired system conditions or specifications. Logic as described herein is limited to statutory subject matter under 35 U.S.C. §101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable storage medium storing computer-executable instructions that when executed by a computer cause the computer to perform functions, the functions comprising:
   providing an adapter data file storing adapter data corresponding to a plurality of adapters for respective enterprise applications, where an adapter for a given enterprise application comprises:
      a publisher module comprising computer code configured to i) capture respective messages from the enterprise application and ii) publish the respective captured messages to a respective topic in the messaging system, and
      a subscriber module comprising computer code configured to i) receive, from the messaging system, messages published to a topic to which the enterprise application subscribes and ii) communicate the received messages to the enterprise application;
   providing a flow data file storing flow data corresponding to a plurality of flows, where each flow is mapped to a message topic and defines a publisher application that publishes messages to the topic and at least one subscriber application that subscribes to the topic;
   in response to a request to integrate a selected enterprise application into an enterprise system that includes one other enterprise application:
      receiving a first message topic subscribed to by the selected enterprise application and a second message topic published to by the selected enterprise application; and
      generating an adapter application for the selected enterprise application by:
         selecting, from the adapter data file, an adapter for the selected enterprise application;
         identifying, in the flow data file, a first flow associated with the first message topic that defines the selected enterprise application as the subscriber application;
         configuring the subscriber module to subscribe to the first message topic;
         identifying, in the flow data file, a second flow associated with the second message topic that defines the selected enterprise application as the publisher application; and
         configuring the publisher module to publish to the second message topic.

2. The non-transitory computer-readable storage medium of claim 1, where the functions further comprise receiving location data that defines integration bus computer hardware on which the adapter will be executed and deploying the adapter on the integration bus computer hardware.

3. The non-transitory computer-readable storage medium of claim 2, where the integration bus computer hardware is different from computer hardware on which the selected enterprise application is executed.

4. The non-transitory computer-readable storage medium of claim 2, the functions further comprising providing a user interface configured to prompt a user to enter the location data.

5. The non-transitory computer-readable medium of claim 1, where the adapter data file and the flow data file are XML files.

6. The non-transitory computer-readable medium of claim 1, where the functions further comprise:
   identifying, in the second flow, the other enterprise application as a subscriber application to the second topic; and
   configuring an adapter for the other enterprise application to subscribe to the second topic.

7. A computing system, comprising:
   a processor;
   computer-readable storage medium storing:
      an adapter data file storing adapter data corresponding to a plurality of adapters for respective enterprise applications, where an adapter for a given enterprise application comprises:
         a publisher module comprising computer code configured to i) capture respective messages from the enterprise application and ii) publish the respective captured messages to a respective topic in the messaging system, and
         a subscriber module comprising computer code configured to i) receive, from the messaging system, messages published to a topic to which the enterprise application subscribes and ii) communicate the received messages to the enterprise application;
      a flow data file storing flow data corresponding to a plurality of flows, where each flow is mapped to a message topic and defines a publisher application that publishes messages to the topic and at least one subscriber application that subscribes to the topic;

compiler logic configured to cause the processor to, in response to a request to integrate a selected enterprise application into an enterprise system that includes one other enterprise application:

receive a first message topic subscribed to by the selected enterprise application and a second message topic published to by the selected enterprise application; and generate an adapter application for the selected enterprise application by:

select, from the adapter data file, an adapter for the selected enterprise application;

identify, in the flow data file, a first flow associated with the first message topic that defines the selected enterprise application as the subscriber application;

configure the subscriber module to subscribe to the first message topic;

identify, in the flow data file, a second flow associated with the second message topic that defines the selected enterprise application as the publisher application; and     configure the publisher module to publish to the second message topic.

8. The computing system of claim 7, where the compiler logic is configured to receive location data that identifies integration bus computer hardware on which the adapter application will be executed and where the system further comprises deployment logic configured to deploy the adapter application on the integration bus computer hardware.

9. The computing system of claim 8, where the integration bus computer hardware is different from computer hardware on which the selected enterprise application is executed.

10. The computing system of claim 8, further comprising a user interface configured to prompt a user to enter the location data.

11. The computing system of claim 8, where the adapter data file and the flow data file are XML files.

12. The computing system of claim 8, where the compiler logic is further configured to:

identify, in the second flow, the other enterprise application as a subscriber application to the second topic; and     configure an adapter for the other enterprise application to subscribe to the second topic.

13. A computer-implemented method, comprising:

providing, on a computer-readable storage medium, an adapter data file storing adapter data corresponding to a plurality of adapters for respective enterprise applications, where an adapter for a given enterprise application comprises:

a publisher module comprising computer code configured to i) capture respective messages from the enterprise application and ii) publish the respective captured messages to a respective topic in the messaging system, and     a subscriber module comprising computer code configured to i) receive, from the messaging system, messages published to a topic to which the enterprise application subscribes and ii) communicate the received messages to the enterprise application;

providing, on the computer-readable storage medium, a flow data file storing flow data corresponding to a plurality of flows, where each flow is mapped to a message topic and defines a publisher application that publishes messages to the topic and at least one subscriber application that subscribes to the topic;

in response to a request to integrate a selected enterprise application into an enterprise system that includes one other enterprise application:

receiving a first message topic subscribed to by the selected enterprise application and a second message topic published to by the selected enterprise application; and     generating an adapter application for the selected enterprise application by:

selecting, from the adapter data file, an adapter for the selected enterprise application;

identifying, in the flow data file, a first flow associated with the first message topic that defines the selected enterprise application as the subscriber application;

configuring the subscriber module to subscribe to the first message topic;

identifying, in the flow data file, a second flow associated with the second message topic that defines the selected enterprise application as the publisher application; and     configuring the publisher module to publish to the second message topic.

14. The computer-implemented method of claim 13, further comprising receiving location data that defines integration bus computer hardware on which the adapter will be executed and deploying the adapter on the integration bus computer hardware.

15. The computer-implemented method of claim 14, where the integration bus computer hardware is different from computer hardware on which the selected enterprise application is executed.

16. The computer-implemented method of claim 14, further comprising providing a user interface configured to prompt a user to enter the location data.

17. The computer-implemented method of claim 13, where the adapter data file and the flow data file are XML files.

18. The computer-implemented method of claim 13, further comprising:

identifying, in the second flow, the other enterprise application as a subscriber application to the second topic; and     configuring an adapter for the other enterprise application to subscribe to the second topic.

\* \* \* \* \*